F. M. ZOTTOLI.
RESILIENT VEHICLE WHEEL.
APPLICATION FILED JUNE 6, 1922.

1,438,512.

Patented Dec. 12, 1922.

INVENTOR:
Frank M. Zottoli
by MacLeod, Calver, Copeland & Dike
Attys.

Patented Dec. 12, 1922.

1,438,512

UNITED STATES PATENT OFFICE.

FRANK M. ZOTTOLI, OF BOSTON, MASSACHUSETTS.

RESILIENT VEHICLE WHEEL.

Application filed June 6, 1922. Serial No. 566,395.

*To all whom it may concern:*

Be it known that I, FRANK M. ZOTTOLI, a citizen of the United States, residing at Boston, county of Suffolk, State of Massachusetts, have invented a certain new and useful Improvement in Resilient Vehicle Wheels, of which the following is a specification, reference being had therein to the accompanying drawings.

The invention relates to vehicle wheels having tires of the resilient type. The invention is an improvement upon the device shown in an application filed by me December 2, 1921, Serial No. 519,548 allowed April 14, 1922. It has for its object to provide an improved resilient tire structure of relatively simple and inexpensive character which will provide a cushioning effect substantially equal to that of a pneumatic tire, while avoiding the well-known objections to the latter, and which necessitates practically no change in or modification of the construction of the wheel proper or of the felly of the wheel, and which is of durable and substantial construction so as to meet the requirements of use which includes the necessary power transmitting connections to adapt the same for application to a traction wheel. One object of the invention is to provide a construction which will afford the necessary resistance to side strain and which is of a sectional form permitting a worn or accidentally injured portion thereof to be renewed without replacing the entire structure. Another object of the invention is to provide means for preventing the sectional tread portions from creeping.

The foregoing and other objects of the invention, together with means whereby the same may be carried into effect, will best be understood from the following description, taken in connection with the accompanying drawings.

In the drawings, Figure 1 is a sectional view of a portion of a vehicle wheel embodying the invention.

Figure 1:
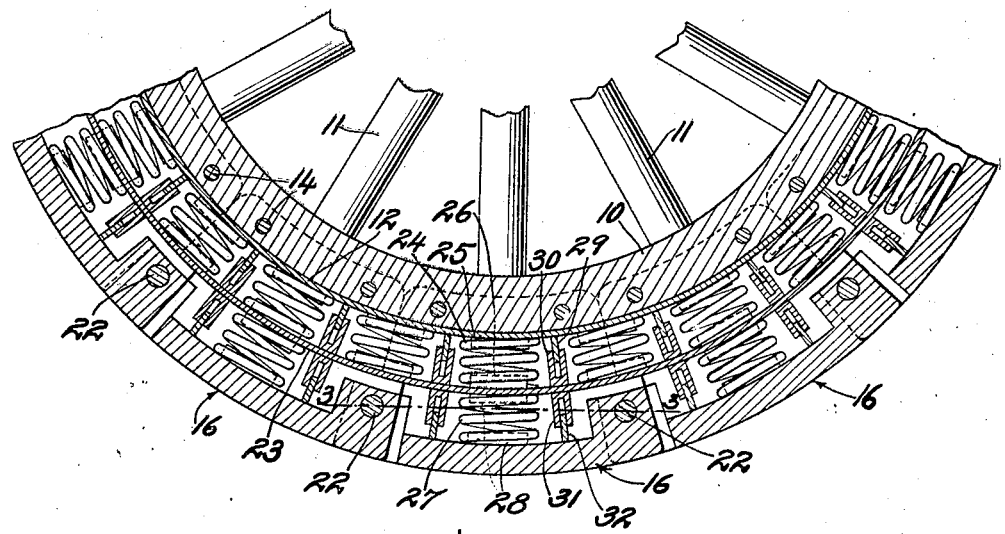

Referring now to the drawings, there is shown at 10 a wheel felly connected by spokes 11 with a hub, not shown, said felly spokes and hub being of any suitable or well-known construction.

Encircling the felly is a metal band 12 having an annular series of side flanges 13—13 which extend radially inward and engage the side faces of the felly, and are suitably secured thereto as by screws or bolts 14. Said band 12 also has radial outwardly extending side flanges 15—15 in continuation of the flanges 13—13. Said flanges 15—15 form together with the band 12 a channel encircling the periphery of the felly 10.

Figure 2:
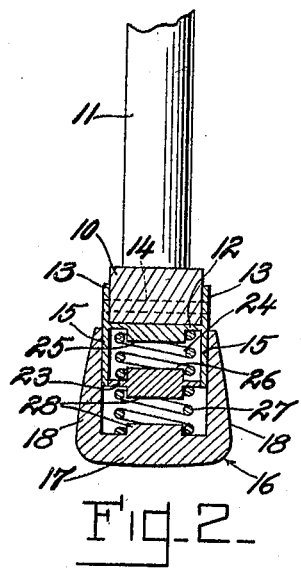
Fig. 2 is a transverse vertical section of a portion of the wheel.

A plurality of tread sections 16 are provided which are hinged together, forming an endless tread portion which encircles the said flanged band 12 and the channel formed by the flanges 15—15. Said tread sections 16 may be made of any suitable material possessing the necessary rigidity, but are preferably composed of metal. Each of said tread sections is U-shaped in cross section, having a base or tread portion 17 and parallel side portions 18—18 which telescope onto the flanges 15—15 of the felly band 12, as shown in Figure 2.

Preferably there should be as many of these tread sections as there are spokes in the wheel. These tread sections are hinged together in any suitable way, so that they may yield as they successively strike the ground on the under side of the wheel. The preferred method of hinging them is as follows:—

Figure 3:
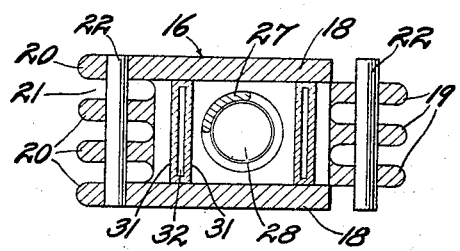
Fig. 3 is a section taken on line 3—3 of Fig. 1.
Figure 4:
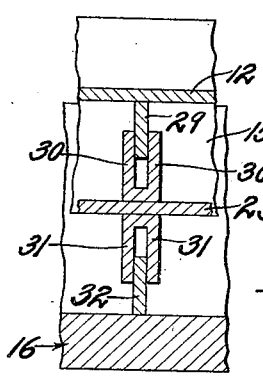
Fig. 4 is an enlarged sectional detail showing the means for preventing the creeping.

The contiguous sections 16 are formed with interengaging teeth at their ends, one end being formed with teeth 19 and the other end being formed with teeth 20, as shown in Figure 3, so that the teeth 19 of one section will engage in the spaces 21 between the teeth of the adjacent section, and the teeth 20 will interengage with the spaces between the teeth 19 of the adjacent section and with the spaces outside of the outer teeth 19. Every two adjacent sections are hinged together by a pin 22.

A band 23 of larger diameter than the felly band 12 encircles the felly band, said band 23 being sufficiently narrow to fit inside of the flanges 15—15 of the felly band 12. An annular series of springs 24 are radially disposed within the annular channel formed by the flanges 15—15 and felly band 12, said springs forming a spring seat for the band 23. In order to properly position said springs and hold them in place, the felly band 12 is provided on its periphery with an annular series of nubs or buttons 25, spaced apart from each other according to the predetermined spacing of the springs, said buttons entering the open inner ends of the said several springs to properly position them. The annular band 23 is also provided on its inner periphery with an annular series of buttons 26 which engage the outer ends of the said springs 24. The two sets of buttons, therefore, maintain the springs 24 in proper relative position.

A series of springs 27 are inserted in the annular series of tread sections 16, each tread section receiving a spring and being formed with a button 28 to engage one end of the spring, the intermediate band 23 being provided on its outer periphery with a corresponding number and arrangement of buttons 28 to receive the inner ends of the springs 27.

Preferably there are twice as many springs in the inner series mounted on the felly band 12 as there are in the tread sections; that is, preferably there are springs mounted on the felly band in direct alignment with the springs in the tread sections, and there are also springs mounted on the felly band opposite the hinged ends of the tread sections, as shown in Figure 1.

Means are provided to prevent the creeping of the tread sections, the means preferred and as shown in the drawings being as follows: Rigidly connected with or integral with the felly band 12 is an annular series of tongues 29 extending radially outward from the band 12, there being one of these tongues intermediate each two adjacent springs 24 of the inside series. The intermediate band 23 is formed with a series of U-shaped lips 30, which extend radially inward, suitable in number, position and form to receive between each pair of lips 30—30 one of the tongues 29 which project from the felly band 12. Each tread section 16 is formed with a radial inwardly extending tongue 32 and the band 23 is formed with a series of outwardly extending radial lips 31 similar to the lips 30 to receive the tongues 32. It will thus be obvious, that, as the felly band 12 is rigidly connected with the felly, the several tongues 29 engaging with the lips 30, will prevent the intermediate band 23 from creeping and this in turn being kept from creeping will by means of the interengagement of the lips 31 with the tongues 32 keep the tire sections 16 from creeping.

What I claim is:

1. In a vehicle wheel, a felly having secured thereto a channel member which encircles the periphery of the felly, an annular series of springs radially mounted in said channel member, an annular band seated upon the outer ends of said springs, an annular series of tread members hinged together encircling said annular band and having side flanges which telescope onto the sides of said channel member, the flanges and tread side of each of said tread members forming a socket, and springs seated in the sockets in said tread members, the inner ends of which engage the outer face of said annular band and the outer ends of which form a spring seat for the tread members.

2. A vehicle wheel having a channel member secured to the periphery of the felly, a series of springs mounted in said channel member, an annular band seated upon the said springs, an annular series of tread members encircling said band, and springs intermediate said band and said tread members on which the tread members are seated.

3. A vehicle wheel having a channel member secured to the periphery of the felly, a series of springs mounted in said channel member, an annular band seated upon the said springs, an annular series of tread members encircling said band, springs intermediate said band and said tread members on which the tread members are seated, and means for preventing the tread members from creeping with relation to the said band and felly.

4. A vehicle wheel having a channel member secured to the periphery of the felly, a series of springs mounted in said channel member, an annular band seated upon the said springs, an annular series of tread members encircling said band, springs intermediate said band and said tread members on which the tread members are seated, means for preventing the tread members from creeping with relation to the said band and felly, said band and felly having interengaging portions which permit a radial movement of the said band with relation to the wheel but which prevent circumferential motion, said band and said tread members also having interengaging portions which permit radial movement of the tread sections with relation to the said band but which prevent circumferential motion of the tread sections with relation to the said band.

5. A vehicle wheel having a channel member secured to the periphery of the felly, a series of springs mounted in said channel member, an annular band seated upon the said springs, an annular series of tread members encircling said band, springs intermediate said band and said tread members on which the tread members are seated, the said channel member having a series of tongues extending radially outward between the springs seated thereon, the said band having a series of lips extending radially inward with which said tongues are in sliding engagement, said band also having a series of lips extending radially outward and the tread sections having tongues extending radially inward which have a slidable engagement with the said last mentioned lips on the band, whereby the said tread sections and the band intermediate the tread sections and the felly are permitted radial movement with relation to the felly but are prevented from circumferential movement with relation to the felly.

6. A vehicle wheel having a channel member secured to the periphery of the felly, a series of springs mounted in said channel member, an annular band of larger diameter than the felly seated upon the said springs, an annular series of tread members pivotally connected together and encircling said band, the annulus formed by said tread members being of greater diameter than the said band, and springs intermediate said band and said tread members on which the tread members are seated.

7. A vehicle wheel having a channel member secured to the periphery of the felly, a series of springs mounted in said channel member, an annular band of larger diameter than the felly seated upon the said springs, an annular series of tread members pivotally connected together and encircling said band, the annulus formed by said tread members being of greater diameter than the said band, springs intermediate said band and said tread members on which the tread members are seated, said band having projections upon its inner and outer periphery which respectively engage with projections from the outer periphery of the channel member and the inner periphery of the tread members, so constructed and arranged that the said tread members and annular band are permitted a radial movement with relation to the wheel but are held from circumferential movement with relation to the wheel.

In testimony whereof I affix my signature.

FRANK M. ZOTTOLI.